(No Model.)
C. W. HUNT.
CAR TRUCK.
No. 454,273. Patented June 16, 1891.
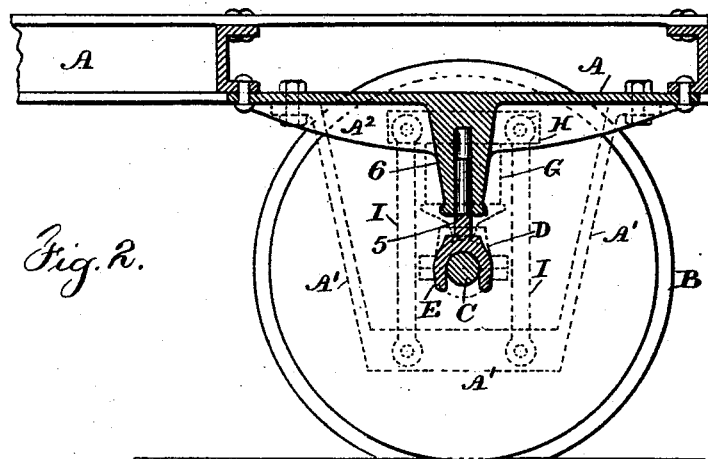
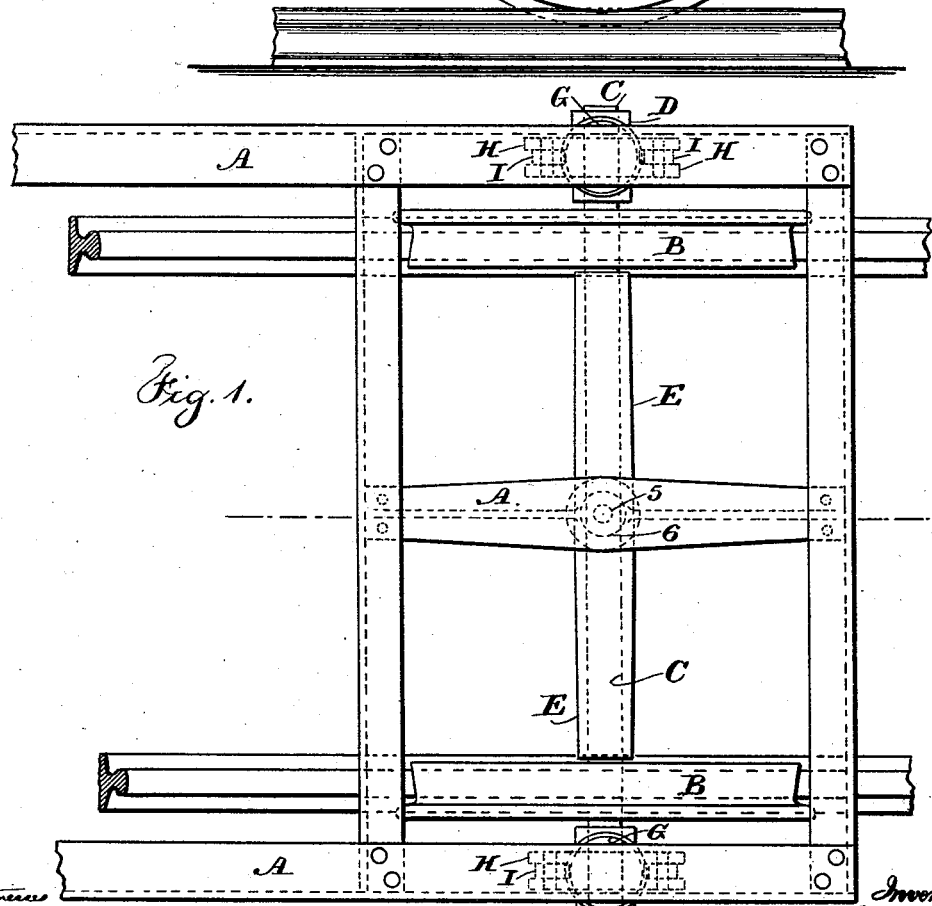
Witnesses: Chas. H. Smith, J. Stait
Inventor: Charles W. Hunt
per Lemuel W. Serrell, Atty.

UNITED STATES PATENT OFFICE.

CHARLES W. HUNT, OF WEST NEW BRIGHTON, NEW YORK.

CAR-TRUCK.

SPECIFICATION forming part of Letters Patent No. 454,273, dated June 16, 1891.

Application filed February 16, 1891. Serial No. 381,598. (No model.)

*To all whom it may concern:*

Be it known that I, CHARLES W. HUNT, a citizen of the United States, residing at West New Brighton, in the county of Richmond and State of New York, have invented an Improvement in Car-Trucks, of which the following is a specification.

In Letters Patent No. 347,936 a car-truck is represented with a frame, and links by which the frame is suspended from the axle-box, and there is a cross bearer or sleeve between the car-wheels, which cross bearer or sleeve is connected with the car-frame by a triangular frame and king-bolt.

My present invention is made for dispensing with the triangular frame by applying a king-bolt and its socket between the bearer over the axle and the car-body, whereby the king-bolt and bearing prevent the axle moving endwise as such axle swings on the king-bolt in passing over the track.

In the drawings, Figure 1 is a plan view of my improvement, and Fig. 2 is a vertical section at the king-bolt.

The car-frame A is shown as connected with the journal-boxes D by the links I, pivoted at their lower ends to downward projections or pedestals A' beneath the car-frame A, and usually the springs G will intervene between the cross-bar H, to which the links I are connected, and the journal-boxes D, and these links and springs may be between the wheels, as shown in my said patent; but I prefer to place them outside of the wheels, as represented herein, and there is a bearer or sleeve E over the axle C to prevent the axle moving endwise of such bearer, and this bearer is connected by the king-bolt 5 and a tubular socket 6 with the car-frame A.

The socket 6 may be upon the frame A and the king-bolt 5 upon the bearer E, or the reverse, and this tubular socket may be provided with a flange bolted to the frame A for sustaining the parts in their proper positions, as the axle and wheels can swing more or less in moving over a curved track.

The links I that sustain the weight tend to restore the axle to a position at right angles to the car-frame when not otherwise acted upon, and the king-bolt becomes a pivot upon which the parts can turn, and this and the bearers over the axle prevents the axle moving endwise in relation to the car-frame, and the two wheels with outside flanges upon one axle travel upon curved tracks with reliability because the flange of the inner wheel coming against the outside of the inner rail tends to turn the axle into the proper radial position in traveling over the curve.

I claim as my invention—

1. The combination, with the two car-wheels and a connecting-axle having external journals and a frame and bearings outside of the wheels, of a king-bolt and its socket at the middle part of the axle, and a bearing between the king-bolt and the axle for preventing end movement of the axle, substantially as set forth.

2. The combination, with the axle-boxes, axle, and wheels having flanges on the outside, and connections between the axle-boxes and car-frame outside the wheels, of a central king-bolt at the middle part of the axle and its connections to the axle and frame, substantially as set forth.

Signed by me this 12th day of February, 1891.

CHAS. W. HUNT.

Witnesses:
 GEO. T. PINCKNEY,
 WILLIAM G. MOTT.